(12) United States Patent
Sato et al.

(10) Patent No.: US 12,005,529 B2
(45) Date of Patent: Jun. 11, 2024

(54) METHOD FOR MANUFACTURING LAMINATED MOLDING, AND LAMINATED MOLDING

(71) Applicant: KOBE STEEL, LTD., Hyogo (JP)

(72) Inventors: Shinji Sato, Hyogo (JP); Takeshi Yamada, Hyogo (JP); Tatsuya Fujii, Hyogo (JP); Masatoshi Hida, Hyogo (JP); Shuo Huang, Hyogo (JP); Eisuke Kurosawa, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 637 days.

(21) Appl. No.: 17/287,771

(22) PCT Filed: Oct. 21, 2019

(86) PCT No.: PCT/JP2019/041292
§ 371 (c)(1),
(2) Date: Apr. 22, 2021

(87) PCT Pub. No.: WO2020/085295
PCT Pub. Date: Apr. 30, 2020

(65) Prior Publication Data
US 2021/0379685 A1 Dec. 9, 2021

(30) Foreign Application Priority Data
Oct. 24, 2018 (JP) .................. 2018-200279

(51) Int. Cl.
*B23K 9/04* (2006.01)
*B23K 15/00* (2006.01)
(Continued)

(52) U.S. Cl.
CPC ............ *B23K 9/04* (2013.01); *B23K 15/0086* (2013.01); *B33Y 10/00* (2014.12); *B33Y 40/00* (2014.12); *B33Y 80/00* (2014.12)

(58) Field of Classification Search
CPC ........ B22F 10/25; B22F 10/38; B22F 12/222; B22F 12/224; B23K 15/0086;
(Continued)

(56) References Cited

U.S. PATENT DOCUMENTS 5,303,141 A 4/1994 Batchelder et al.
5,402,351 A 3/1995 Batchelder et al.
(Continued)

FOREIGN PATENT DOCUMENTS

JP H05-345359 A 12/1993
JP H09-010938 A 1/1997
(Continued)

OTHER PUBLICATIONS

International Search Report issued in PCT/JP2019/041292; mailed Dec. 10, 2019.
(Continued)

*Primary Examiner* — Dana Ross
*Assistant Examiner* — Joe E Mills, Jr.
(74) *Attorney, Agent, or Firm* — Studebaker & Brackett PC

(57) ABSTRACT

A method for manufacturing an additively-manufactured object, includes: an additively-manufacturing step of building a layered body by depositing a weld bead obtained by melting and solidifying a filler metal, the layered body having an opening along a forming direction of the weld bead and an internal space surrounded by the weld bead; and a closing step of forming a closing wall portion connecting an edge portion of the opening with the weld bead for closing. In the additively-manufacturing step, the opening is formed with a width dimension larger than a bead width of the weld bead, and in the closing step, the closing wall portion having a width dimension larger than the bead width is formed by the weld bead to close the opening.

3 Claims, 17 Drawing Sheets

(51) Int. Cl.
 *B33Y 10/00* (2015.01)
 *B33Y 40/00* (2020.01)
 *B33Y 80/00* (2015.01)

(58) Field of Classification Search
 CPC .......... B23K 2101/045; B23K 2101/24; B23K 9/0216; B23K 9/04; B23K 9/16; B33Y 10/00; B33Y 40/00; B33Y 80/00; Y02P 10/25
 See application file for complete search history.

(56) References Cited

U.S. PATENT DOCUMENTS

2004/0089983 A1* 5/2004 Jamalabad ............ B29C 64/106
 264/497
2018/0141159 A1  5/2018 Niitani et al.
2019/0105712 A1  4/2019 Kamitani et al.
2019/0377326 A1* 12/2019 Katogi ............... B23K 26/0853

FOREIGN PATENT DOCUMENTS

| JP | 2003-266174 A | 9/2003 |
| JP | 2004-017088 A | 1/2004 |
| JP | 2017-193776 A | 10/2017 |
| WO | 2017/163431 A1 | 9/2017 |

OTHER PUBLICATIONS

International Preliminary Report on Patentability and Written Opinion issued in PCT/JP2019/041292; issued Apr. 27, 2021.

* cited by examiner

METHOD FOR MANUFACTURING LAMINATED MOLDING, AND LAMINATED MOLDING

TECHNICAL FIELD

The present invention relates to a method for manufacturing an additively-manufactured object and an additively-manufactured object.

BACKGROUND ART

In recent years, needs for 3D printers as manufacturing means have been increasing, and research and development have been carried out for practical use in the aircraft industry and the like, especially for application to metal materials. A 3D printer using a metal material melts a metal powder or a metal wire by using a heat source such as a laser or an arc, and deposits the molten metal to build a built object.

As a technique for building such a built object by welding, it is known to perform weaving welding in which welding is performed by swinging a torch left and right with respect to a welding direction (see, for example, Patent Literatures 1 and 2).

In addition, there is known a technique for manufacturing a built-up object having an internal space or a built-up object having an overhang shape by supporting the built-up object with a support material when building a built object (see, for example, Patent Literature 3).

CITATION LIST

Patent Literature

Patent Literature 1: JP-A-H09-10938
Patent Literature 2: JP-A-2004-17088
Patent Literature 3: JP-A-2017-193776

SUMMARY OF INVENTION

Technical Problem

However, when building a built-up object while supporting the same with a support material, the support material must be removed after the built-up object is built, and the removal work requires time and effort. Moreover, when the internal space of the built object is a closed space or a narrow space, a tool for removing the support material cannot reach the support material, and it is difficult to remove the support material. Even when the internal space of the built object is a narrow space, if it is an open space, the support material can be removed by using a powder or resin having fluidity as the support material. However, since the support material having fluidity is not easy to handle, the removal work still takes time and effort.

The present invention has been made in view of the above circumstances, and an object of the present invention is to provide a method for manufacturing an additively-manufactured object capable of manufacturing a built object having an internal space easily, and an additively-manufactured object.

Solution to Problem

The present invention includes the following configurations.

(1) A method for manufacturing an additively-manufactured object, including:
an additively-manufacturing step of building a layered body by depositing a weld bead obtained by melting and solidifying a filler metal, the layered body having an opening along a forming direction of the weld bead and an internal space surrounded by the weld bead; and
a closing step of forming a closing wall portion connecting an edge portion of the opening with the weld bead for closing,
in which
in the additively-manufacturing step, the opening is formed with a width dimension larger than a bead width of the weld bead, and
in the closing step, the closing wall portion having a width dimension larger than the bead width is formed by the weld bead to close the opening.

(2) An additively-manufactured object, including:
a layered body formed by depositing a weld bead obtained by melting and solidifying a filler metal, the layered body having an opening along a forming direction of the weld bead and has an internal space surrounded by the weld bead; and
a closing wall portion configured to close the opening,
in which
the opening has a width dimension larger than a bead width of the weld bead, and
the closing wall portion is formed from the weld bead and has a width dimension larger than the bead width of the weld bead.

Advantageous Effects of Invention

According to the present invention, a built object having an internal space can be easily manufactured.

DESCRIPTION OF EMBODIMENTS

Hereinafter, embodiments of the present invention will be described in detail with reference to the drawings.

Figure 1:
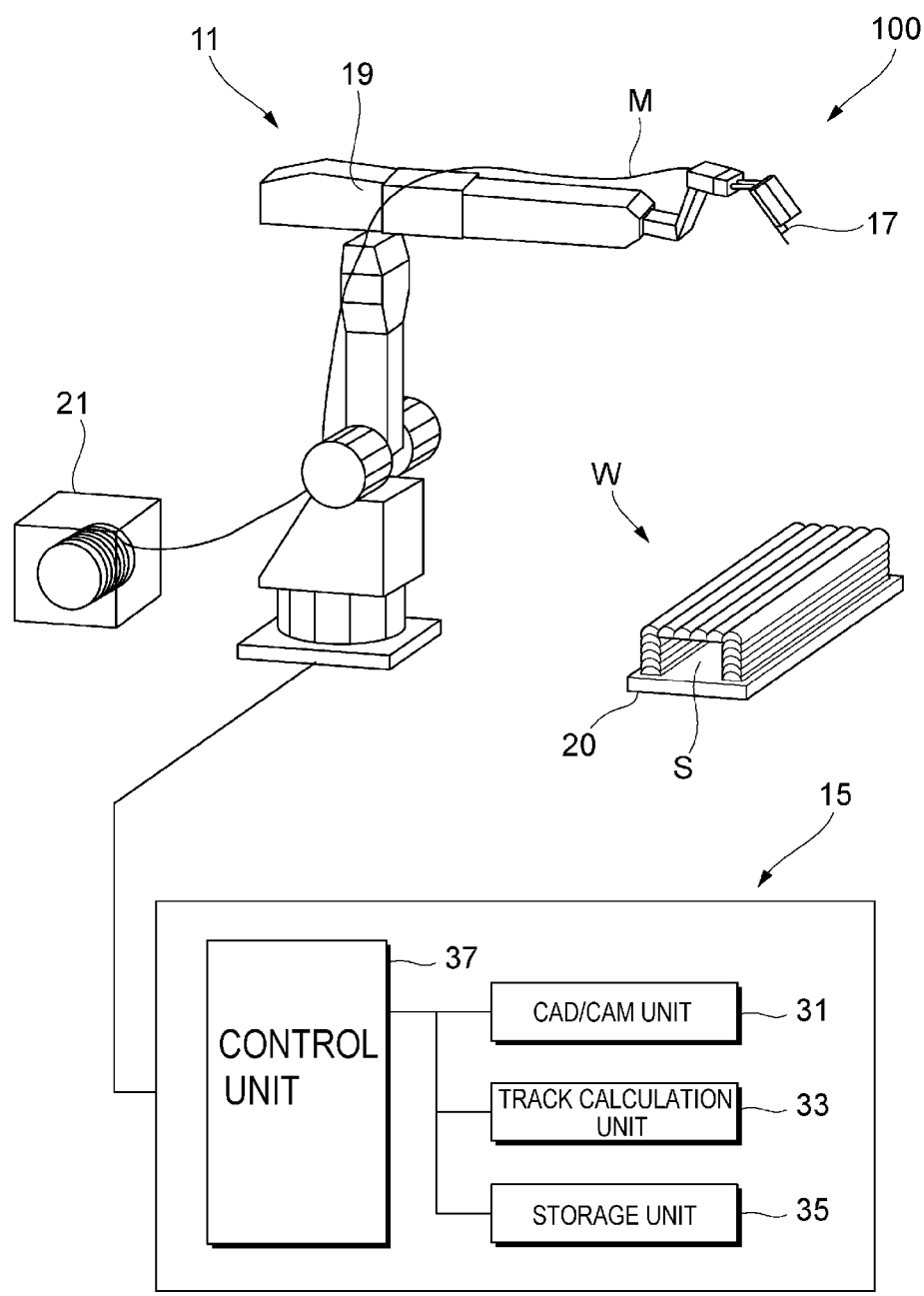
FIG. 1 is a configuration diagram of a manufacturing apparatus for manufacturing an additively-manufactured object.

FIG. 1 is a schematic configuration diagram of a manufacturing system to which a method for manufacturing an additively-manufactured object according to the present invention is applied.

A manufacturing system 100 of this configuration includes an additively-manufacturing device 11 and a controller 15 that controls the additively-manufacturing device 11 in an integrated manner.

The additively-manufacturing device 11 includes a welding robot 19 having a torch 17 on a tip shaft, and a filler metal feeding unit 21 for feeding a filler metal (weld wire) M to the torch 17. The torch 17 holds the filler metal M in a state of protruding from the tip.

The controller 15 includes a CAD/CAM unit 31, a track calculation unit 33, a storage unit 35, and a control unit 37 connected to the above units.

The welding robot 19 is an articulated robot, and the torch 17 provided on the tip shaft is supported such that the filler metal M can be continuously fed. The position or posture of the torch 17 can be set three-dimensionally desirably within the range of the degree of freedom of the robot arm.

The torch 17 includes a shield nozzle (not-shown), and a shielding gas is supplied from the shield nozzle. The arc welding method for use in this configuration may be either a consumable electrode type such as shielded metal arc welding or carbon dioxide gas arc welding, or a non-consumable electrode type such as TIG welding or plasma arc welding. The arc welding method is appropriately selected depending on an additively-manufactured object W to be produced.

For example, in the case of the consumable electrode type, a contact tip is disposed inside the shield nozzle, and the filler metal M to which a melting current is to be supplied is held on the contact tip. The torch 17 generates an arc from the tip of the filler metal M in a shielding gas atmosphere while holding the filler metal M. The filler metal M is fed from the filler metal feeding unit 21 to the torch 17 by a delivery mechanism (not shown) attached to the robot arm, etc. Then, when the filler metal M fed continuously is melted and solidified while moving the torch 17, a linear weld bead 25 which is a melt-solidified body of the filler metal M, is formed.

The heat source for melting the filler metal M is not limited to the aforementioned arc. A heat source using another system such as a heating system using an arc and a laser together, a heating system using a plasma, or a heating system using an electron beam or a laser may be used. In the case of heating by an electron beam or a laser, a heating amount can be controlled more finely to keep the weld bead in a more proper state, thereby contributing to further improvement of the quality of the additively-manufactured object.

The CAD/CAM unit 31 creates shape data of the additively-manufactured object W to be manufactured, and then divides the additively-manufactured object into a plurality of layers to generate layer shape data representing the shape of each layer. The track calculation unit 33 obtains a movement track of the torch 17 based on the generated layer shape data. The storage unit 35 stores data such as the generated layer shape data and the movement track of the torch 17.

The control unit 37 drives the welding robot 19 by executing a drive program based on the layer shape data or the movement track of the torch 17 stored in the storage unit 35. That is, the welding robot 19 moves the torch 17 while melting the filler metal M with an arc based on the movement track of the torch 17 generated by the track calculation unit 33 in response to a command from the controller 15.

The manufacturing system 100 having the above configuration melts the filler metal M while moving the torch 17 by driving the welding robot 19 along the movement track of the torch 17 generated based on the set layer shape data, and supplies the molten filler metal M onto a base 20. Accordingly, the additively-manufactured object W in which a plurality of linear weld beads 25 are deposited on an upper surface of the base 20 is built.

Next, the additively-manufactured object W manufactured in this embodiment will be described.

Figure 2A:
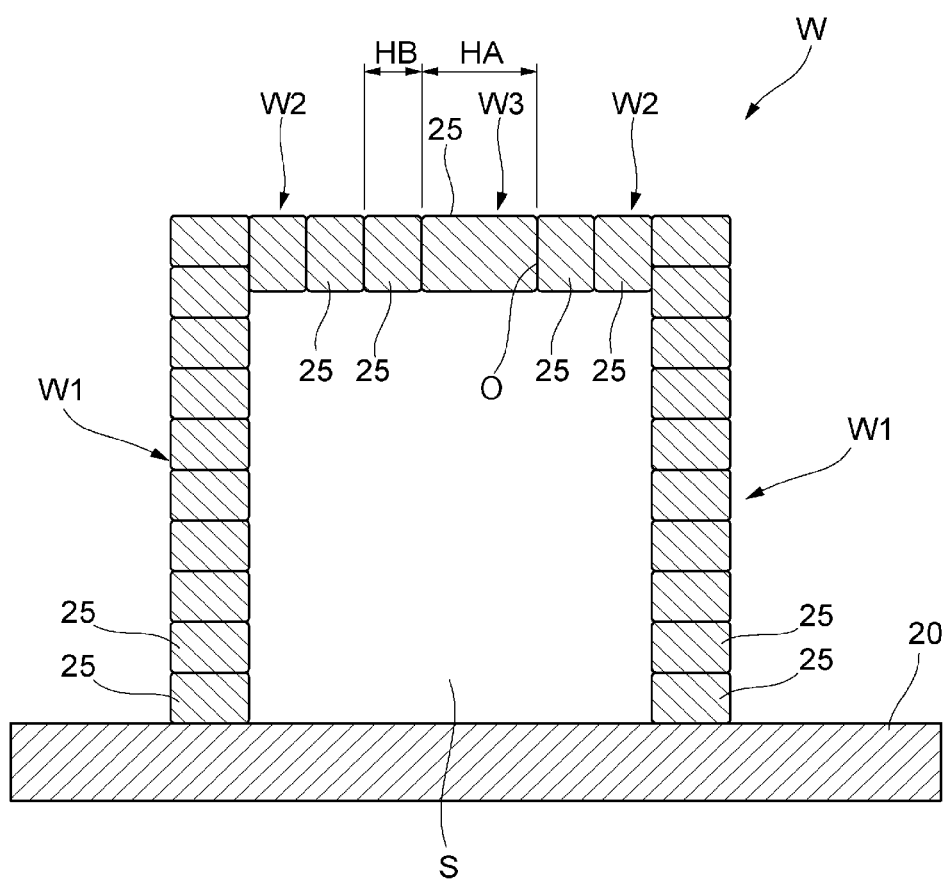
FIG. 2A is a schematic cross-sectional view showing a structure of the additively-manufactured object in a direction orthogonal to a forming direction of the additively-manufactured object.
Figure 2B:
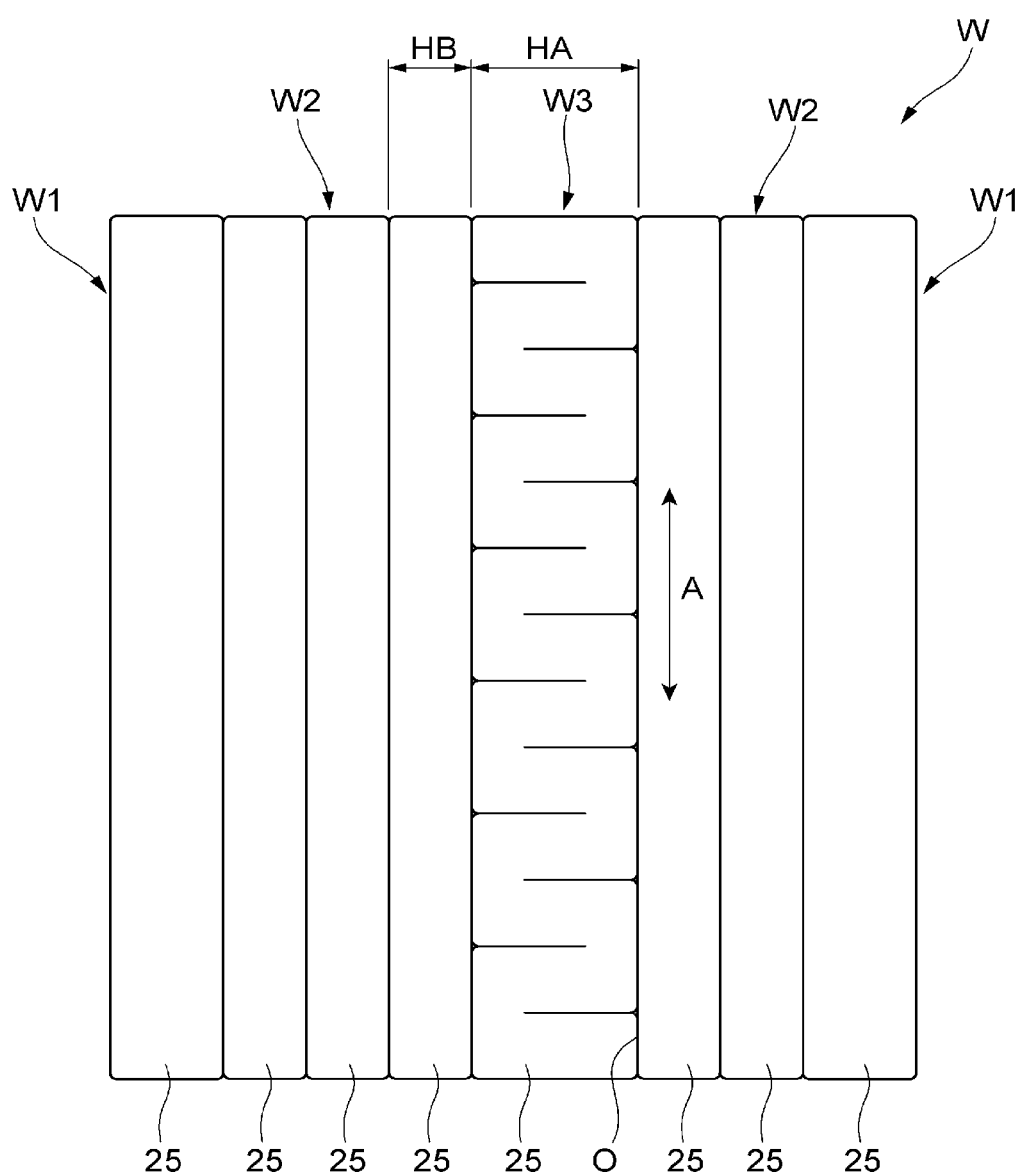
FIG. 2B is a schematic plain view of the additively-manufactured object showing the structure of the additively-manufactured object.

FIG. 2A is a schematic cross-sectional view showing a structure of the additively-manufactured object in a direction orthogonal to a forming direction of the additively-manufactured object. FIG. 2B is a schematic plain view of the additively-manufactured object showing the structure of the additively-manufactured object.

As shown in FIG. 2A and FIG. 2B, the additively-manufactured object W is built by depositing the weld bead 25 on the base 20.

The additively-manufactured object W include the base 20, side wall portions W1, connecting wall portions W2, and a closing wall portion W3. A pair of side wall portions W1 is erected on the base 20 so as to face each other. A pair of connecting wall portions W2 extends laterally from an upper end of each of the side wall portions W1 so as to be close to each other. An opening O is formed at an edge portion in an extending direction, which is a deposition direction of the pair of connecting wall portions W2. The opening O is closed by the closing wall portion W3 formed between the edge portions of the pair of connecting wall portions W2. Accordingly, the additively-manufactured object W has an internal space S surrounded by the base 20, the pair of side wall portions W1, the pair of connecting wall portions W2, and the closing wall portion W3. The opening O may be formed between an end portion at the extending direction of any one of the pair of side wall portions W1 and the edge portion of the connecting wall portion W2 extending from an end portion at the extending direction of the other side wall portion W1.

Next, a procedure for building the additively-manufactured object W using the manufacturing system 100 having this configuration will be described in detail.

Figure 3:
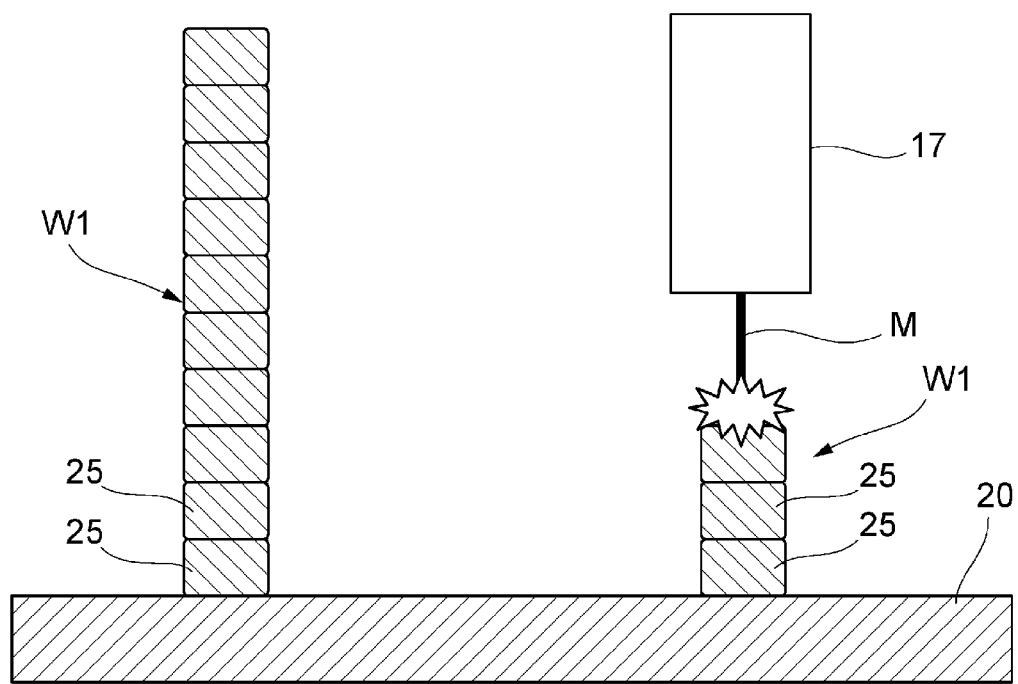
FIG. 3 is a schematic cross-sectional view in the direction orthogonal to the forming direction of the additively-manufactured object, showing an additively-manufacturing step in a method for manufacturing an additively-manufactured object.
Figure 4:
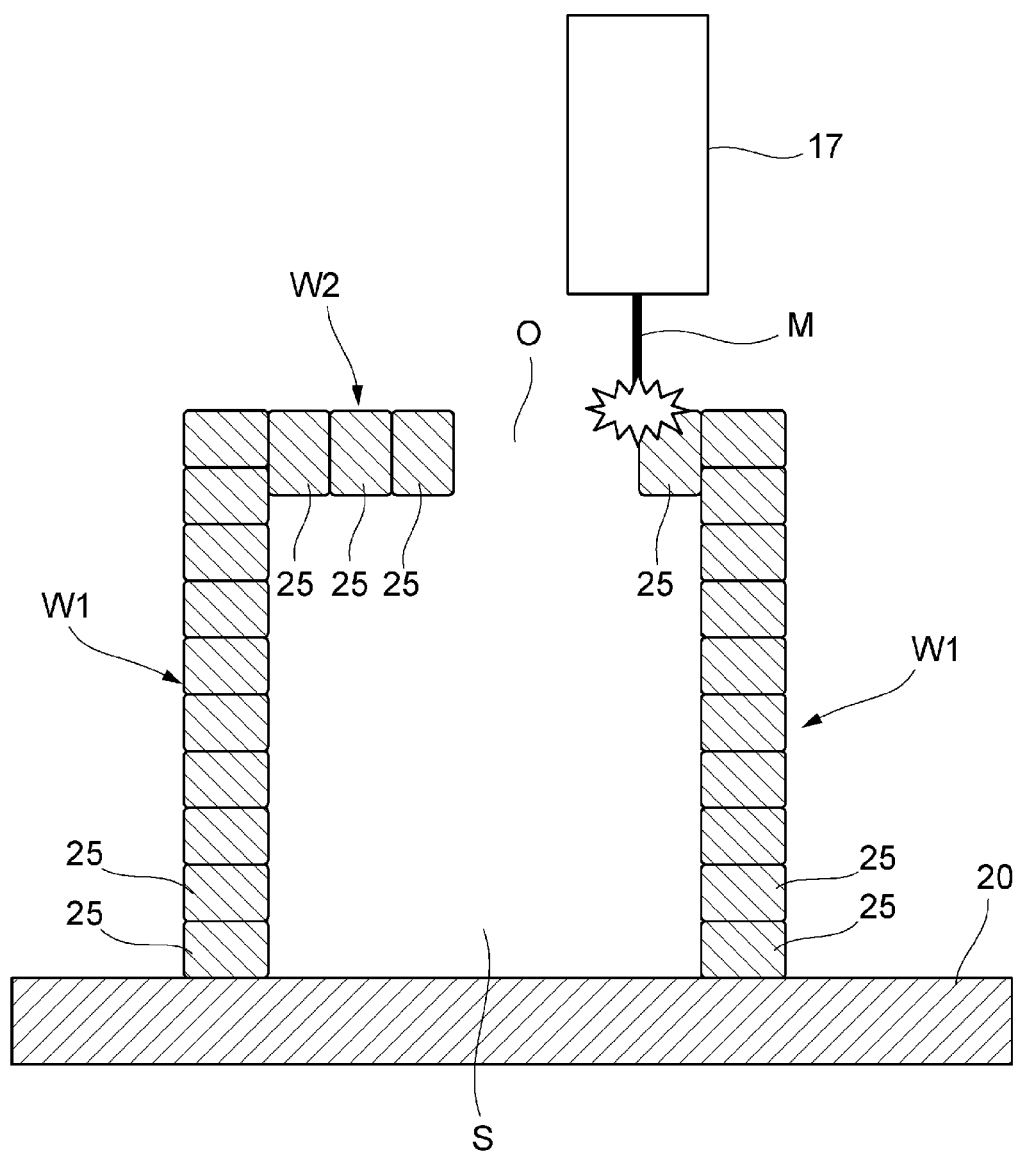
FIG. 4 is a schematic cross-sectional view in the direction orthogonal to the forming direction of the additively-manufactured object, showing the additively-manufacturing step in the method for manufacturing an additively-manufactured object.
Figure 5:
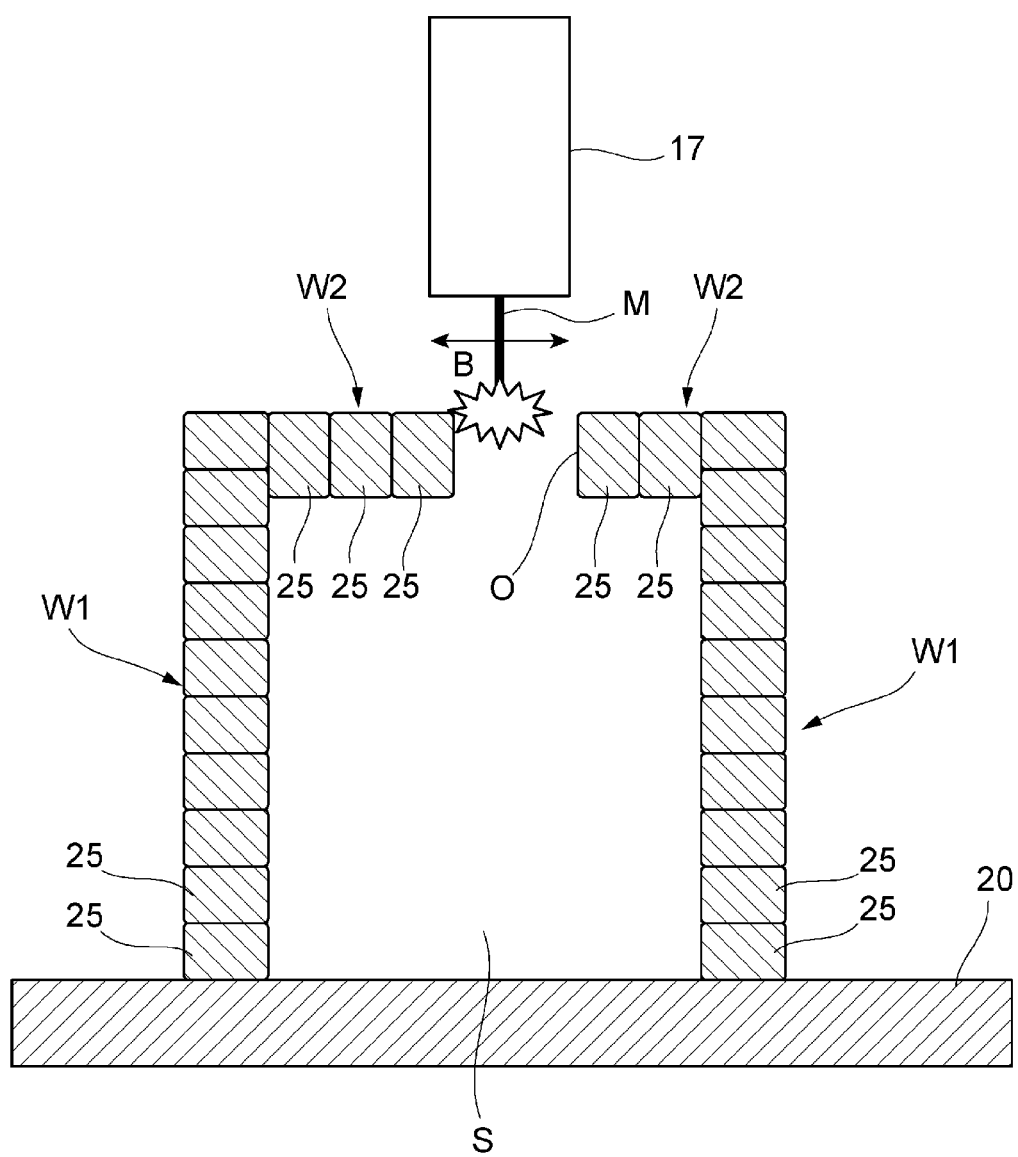
FIG. 5 is a schematic cross-sectional view in the direction orthogonal to the forming direction of the additively-manufactured object, showing a closing step in the method for manufacturing an additively-manufactured object.
Figure 6A:
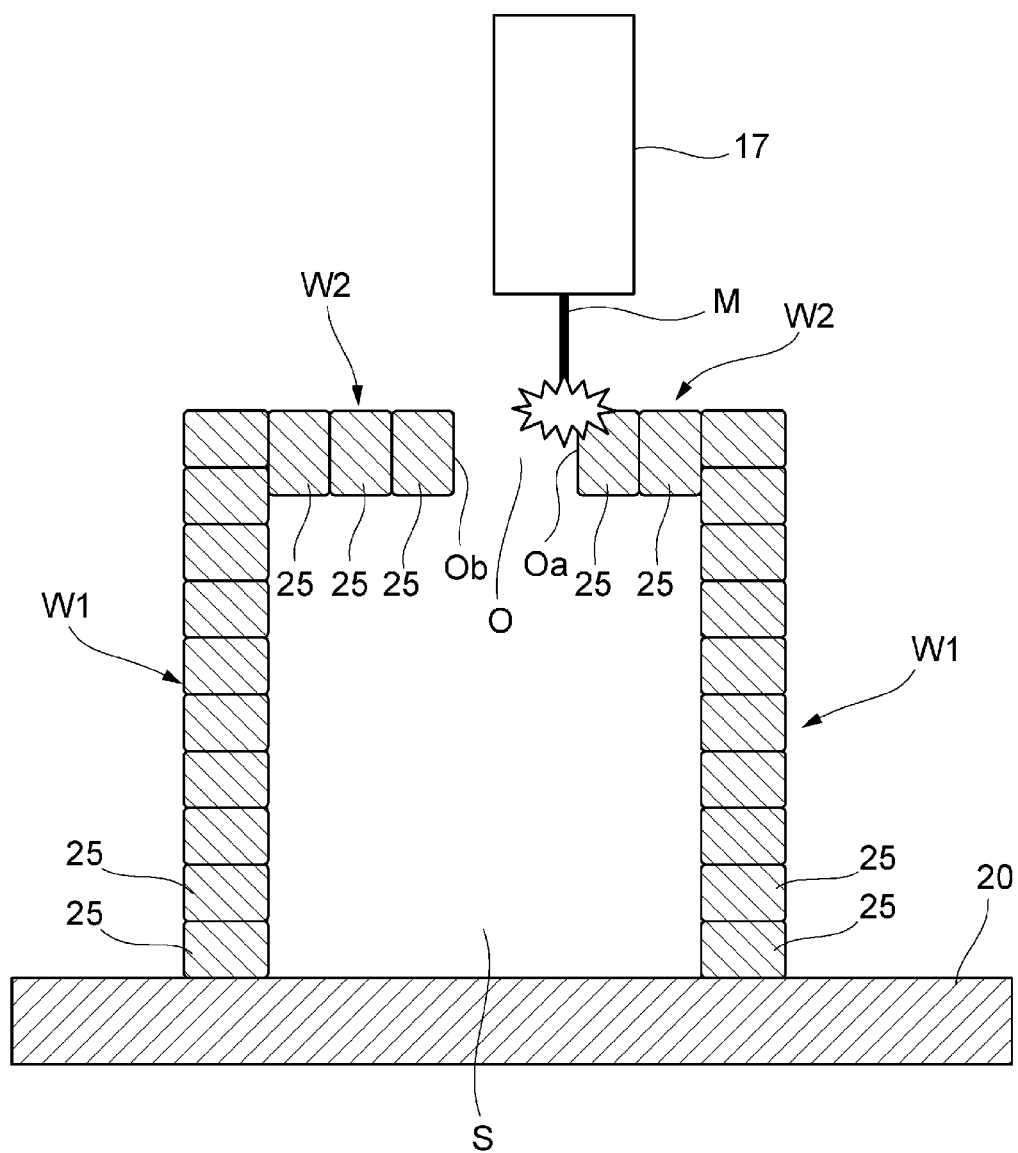
FIG. 6A is a schematic cross-sectional view in the direction orthogonal to the forming direction of the additively-manufactured object, showing a procedure of the closing step in the method for manufacturing an additively-manufactured object.
Figure 6B:
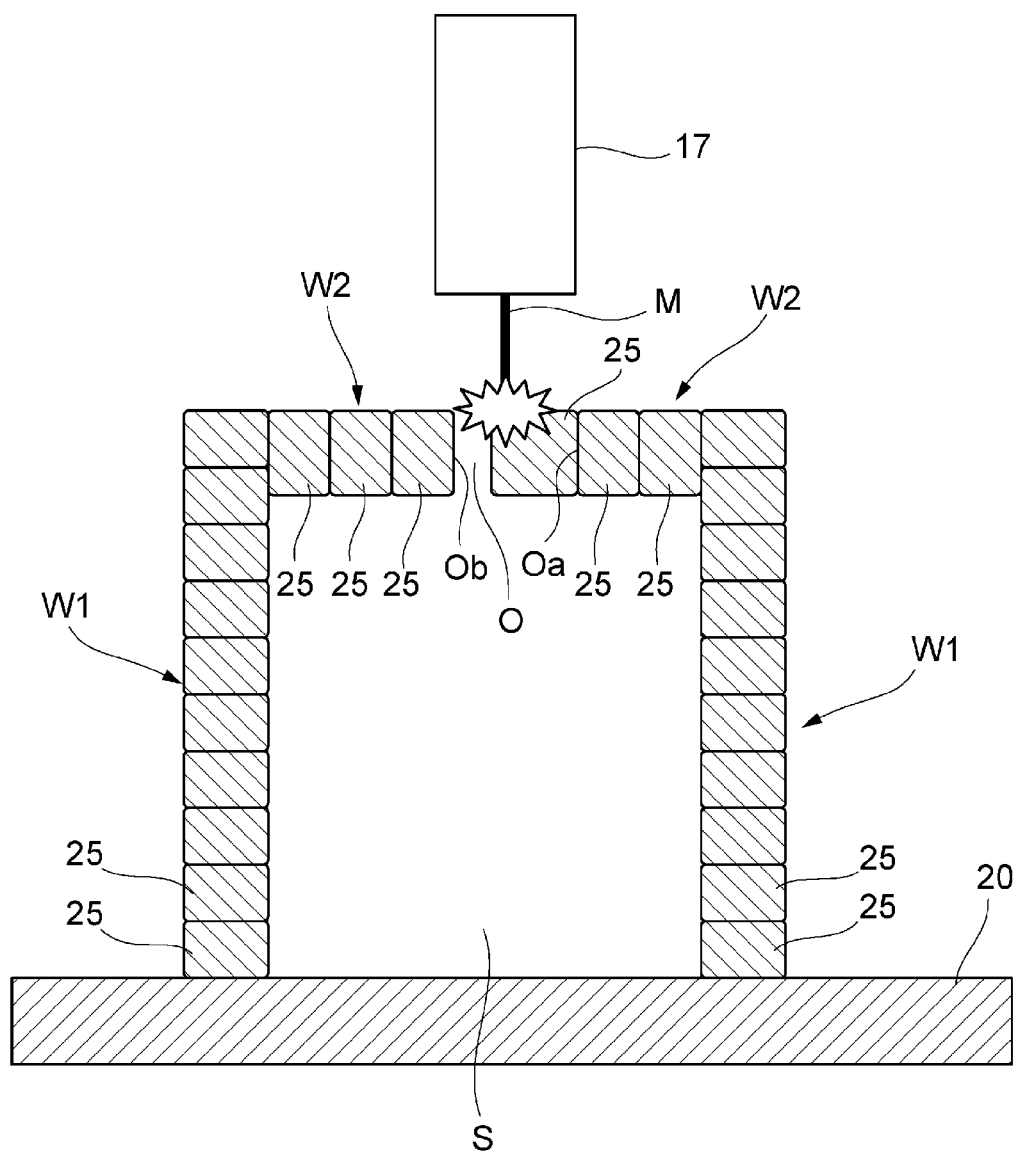
FIG. 6B is a schematic cross-sectional view in the direction orthogonal to the forming direction of the additively-manufactured object, showing the procedure of the closing step in the method for manufacturing an additively-manufactured object.
Figure 6C:
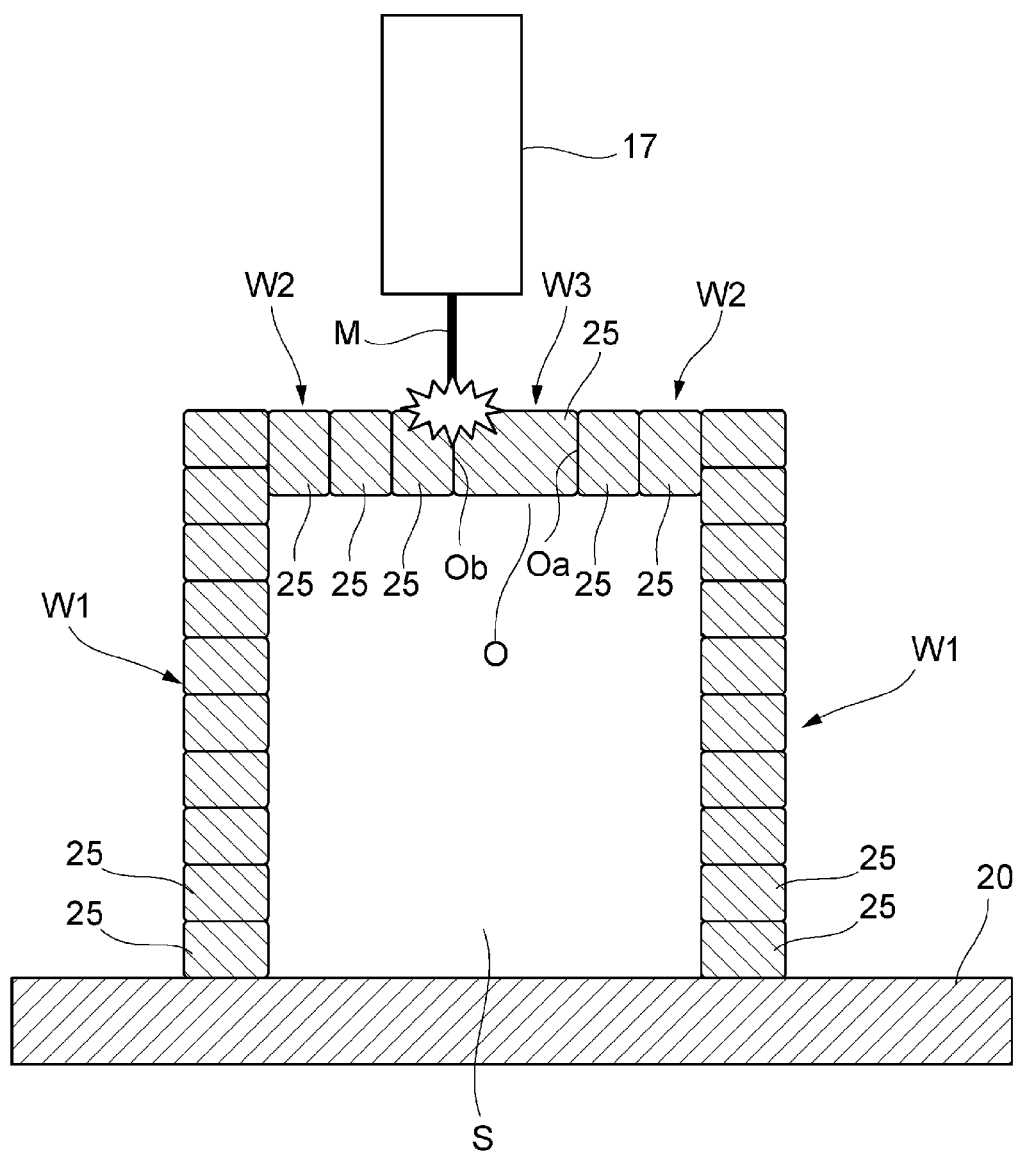
FIG. 6C is a schematic cross-sectional view in the direction orthogonal to the forming direction of the additively-manufactured object, showing the procedure of the closing step in the method for manufacturing an additively-manufactured object.

FIG. 3 and FIG. 4 are schematic cross-sectional views in a direction orthogonal to a forming direction of the additively-manufactured object, showing an additively-manufacturing step in the method for manufacturing an additively-manufactured object. FIG. 5 is a schematic cross-sectional view in the direction orthogonal to the forming direction of the additively-manufactured object, showing a closing step in the method for manufacturing an additively-manufactured object. FIG. 6A to FIG. 6C are schematic cross-sectional views in the direction orthogonal to the forming direction of the additively-manufactured object, showing a procedure of the closing step in the method for manufacturing an additively-manufactured object. FIG. 7A to FIG. 7C and FIG. 8 are schematic plan views of the additively-manufactured object showing the procedure of the closing step in the method for manufacturing an additively-manufactured object.

(Additively-Manufacturing Step)

First, as shown in FIG. 3, the weld beads 25 are formed and deposited on the base 20 by the torch 17 along a bead forming direction A (see FIG. 2B) to build the side wall portions W1 facing each other. Here, in a cross section of one weld bead 25 orthogonal to the bead forming direction A, a height along the deposition direction is referred to as a bead height, and a width along a direction orthogonal to the deposition direction is referred to as a bead width.

Next, as shown in FIG. 4, the weld beads 25 are deposited laterally from the upper end of the side wall portion W1. Then, the connecting wall portion W2 having the opening O along the forming direction A of the weld bead 25 is built on the upper portion of the side wall portion W1. Accordingly, a layered body having the opening O and having the internal space S surrounded by the weld beads 25 is built. At this time, as shown in FIG. 2A and FIG. 2B, the opening O has a width dimension HA in the direction orthogonal to the forming direction A larger than a bead width HB of the weld bead 25.

(Closing Step)

Next, the closing wall portion W3 is formed in the opening O formed in the connecting wall portion W2, and the opening O is closed by the closing wall portion WS3. In the closing step for the opening O, as shown in FIG. 5, the torch 17 is weaved in a width direction of the opening O (in a direction of arrow B in FIG. 5) to form the weld bead 25, and the closing wall portion W3 is built.

Figure 7A:
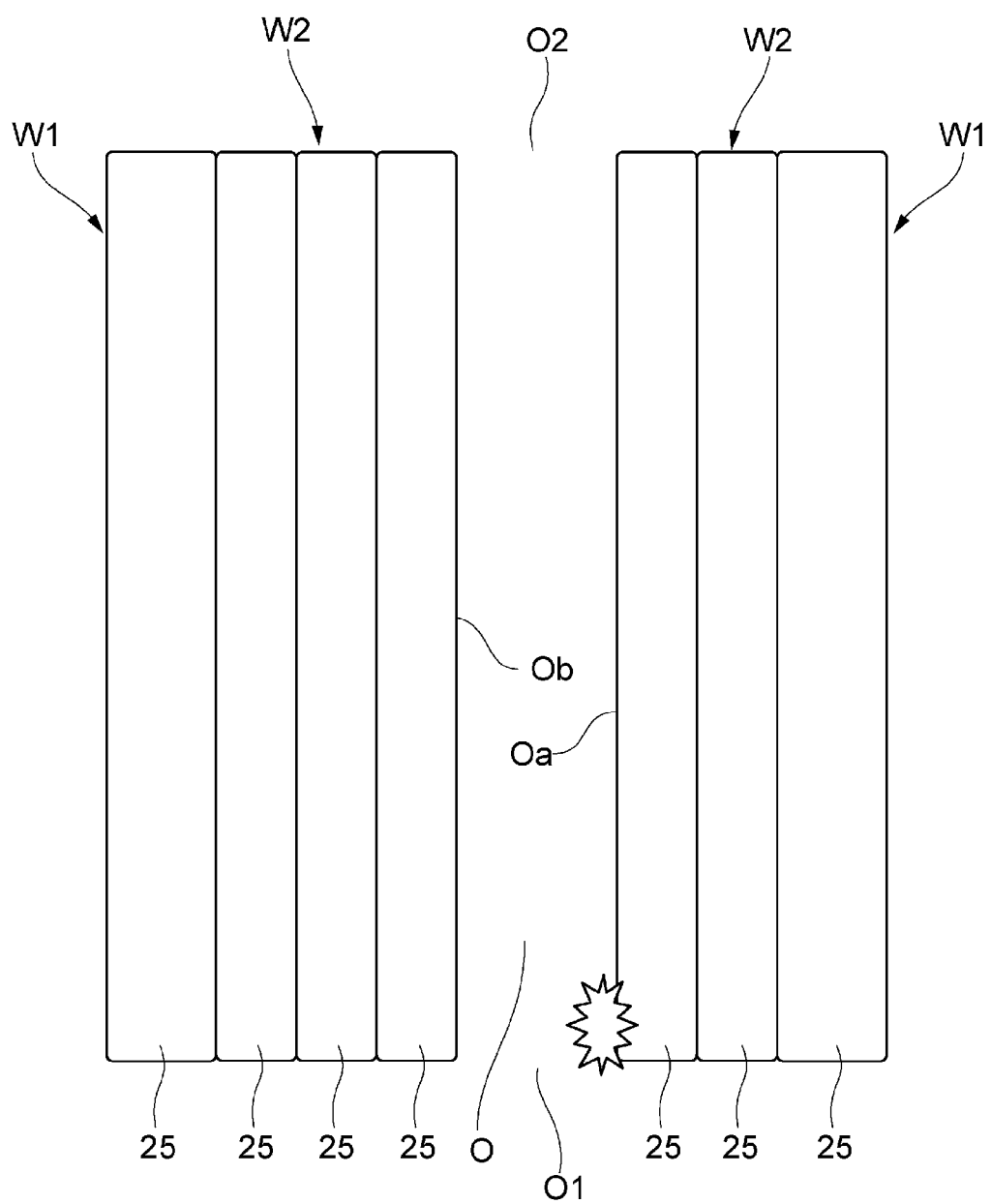
FIG. 7A is a schematic plan view of the additively-manufactured object showing the procedure of the closing step in the method for manufacturing an additively-manufactured object.
Figure 7B:
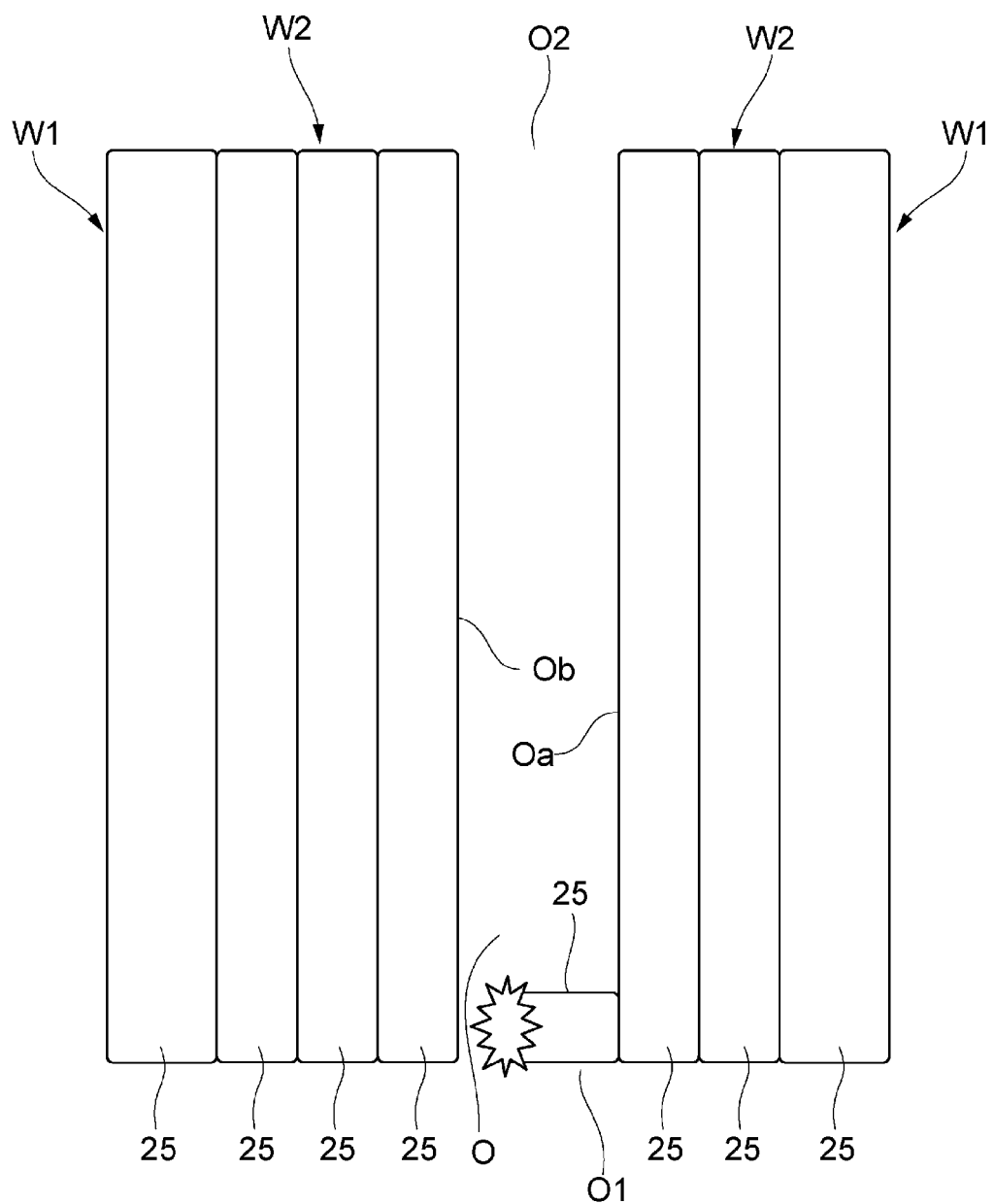
FIG. 7B is a schematic plan view of the additively-manufactured object showing the procedure of the closing step in the method for manufacturing an additively-manufactured object.
Figure 7C:
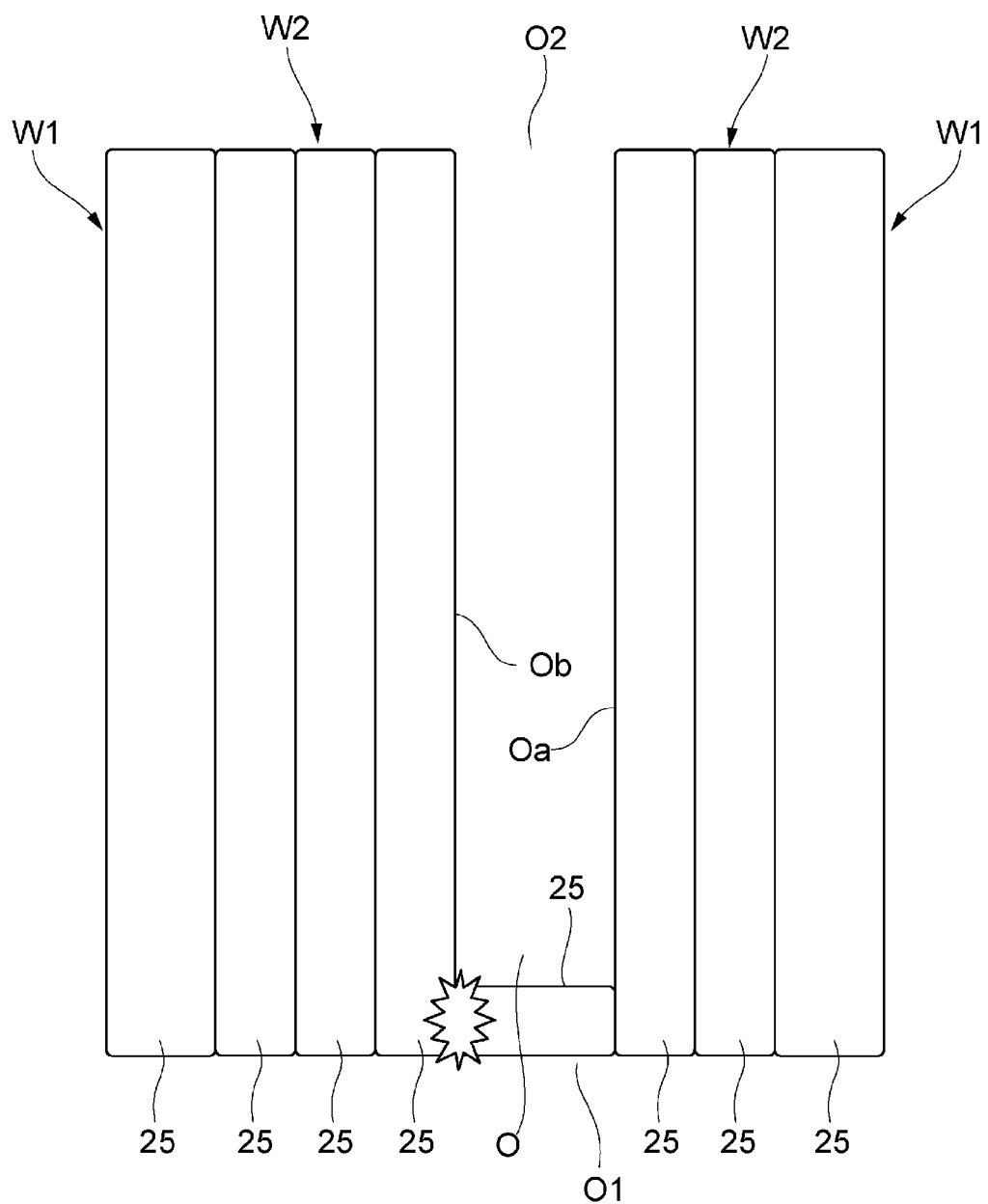
FIG. 7C is a schematic plan view of the additively-manufactured object showing the procedure of the closing step in the method for manufacturing an additively-manufactured object.
Figure 8:
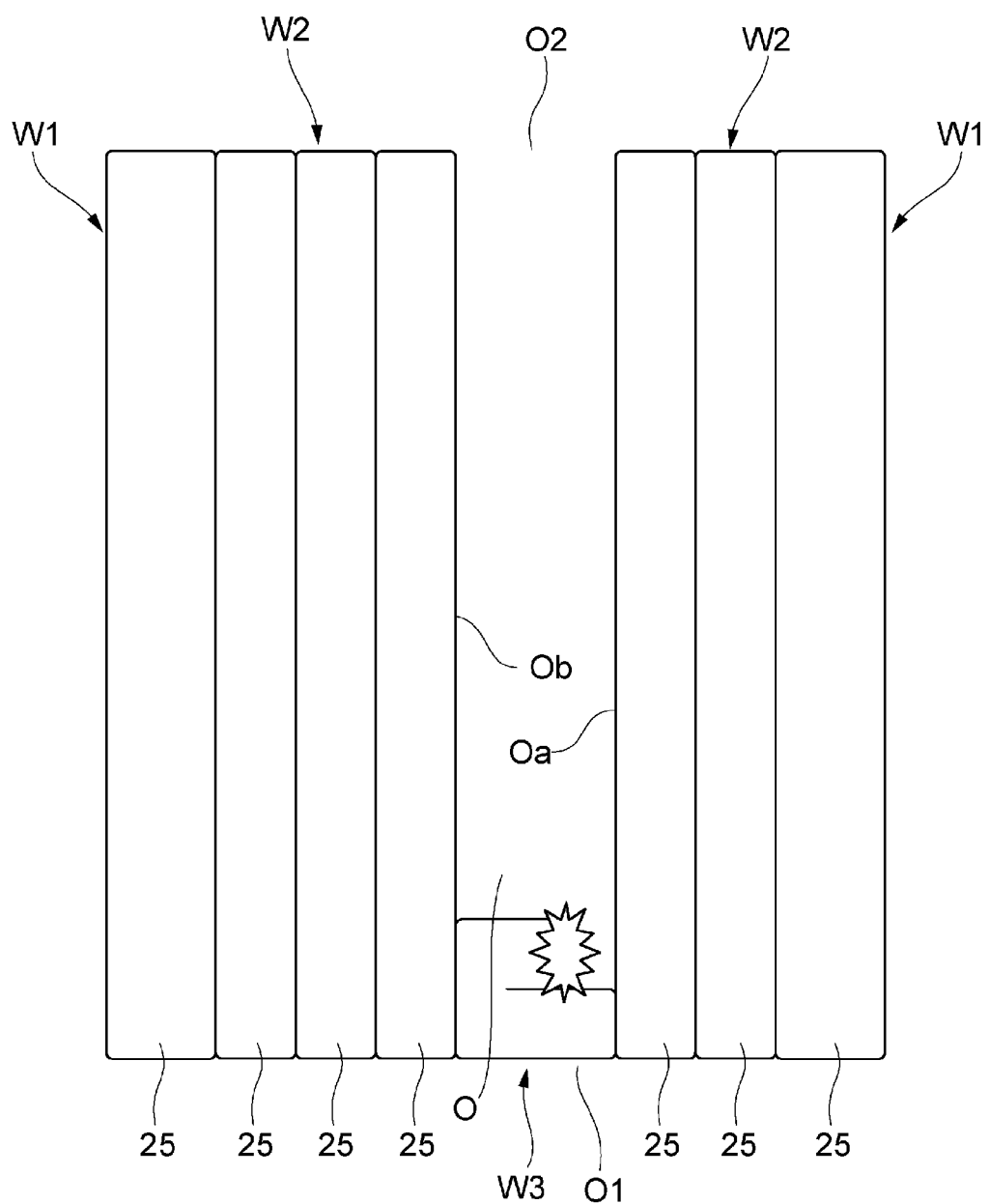
FIG. 8 is a schematic plan view of the additively-manufactured object showing the procedure of the closing step in the method for manufacturing an additively-manufactured object.

Specifically, first, as shown in FIG. 6A and FIG. 7A, one edge portion Oa on the side of one end O1 of the opening O is set as a starting end. Then, as shown in FIG. 6B and FIG. 7B, the torch 17 is disposed at the starting end, and the torch 17 starts forming the weld bead 25 from the starting end. Thereafter, the torch 17 is moved towards the other edge portion Ob of the opening O to form the weld bead 25 towards the other edge portion Ob. As shown in FIG. 6C and FIG. 7C, when the torch 17 is moved to the other edge portion Ob of the opening O and the weld bead 25 reaches the other edge portion Ob of the opening O, as shown in FIG. 8, the torch 17 is displaced toward the side of the other end O2 of the opening O and moved toward the one edge portion Oa of the opening O. Accordingly, the weld bead 25 is formed to overlap the opening O in the forming direction A. Thereafter, the formation of the weld bead 25 by weaving the torch 17 is repeated up to the other end O2 of the opening O. Accordingly, the closing wall portion W3 made of the weld bead 25 formed by weaving the torch 17 is built at the opening O, and the opening O is closed by the closing wall portion W3.

With the above additively-manufacturing step and closing step, the side wall portions W1 are erected on the base 20, and the upper portions of these side wall portions W1 are closed by the connecting wall portions W2 and the closing wall portion W3 to build the additively-manufactured object W having the internal space S.

As described above, according to the method for manufacturing an additively-manufactured object of the present invention, it is possible to manufacture an additively-manufactured object W having the internal space S surrounded by the base 20, the side wall portions W1 facing each other and built on the base 20, the connecting wall portions W2 connecting the upper ends of the side wall portions W1, and the closing wall portion W3 closing the opening O of the connecting wall portion W2. Accordingly, as compared with a case of forming the internal space using a support material, the additively-manufactured object W having the internal space S can be easily manufactured without performing the removal work for the support material that requires time and effort.

Figure 9:
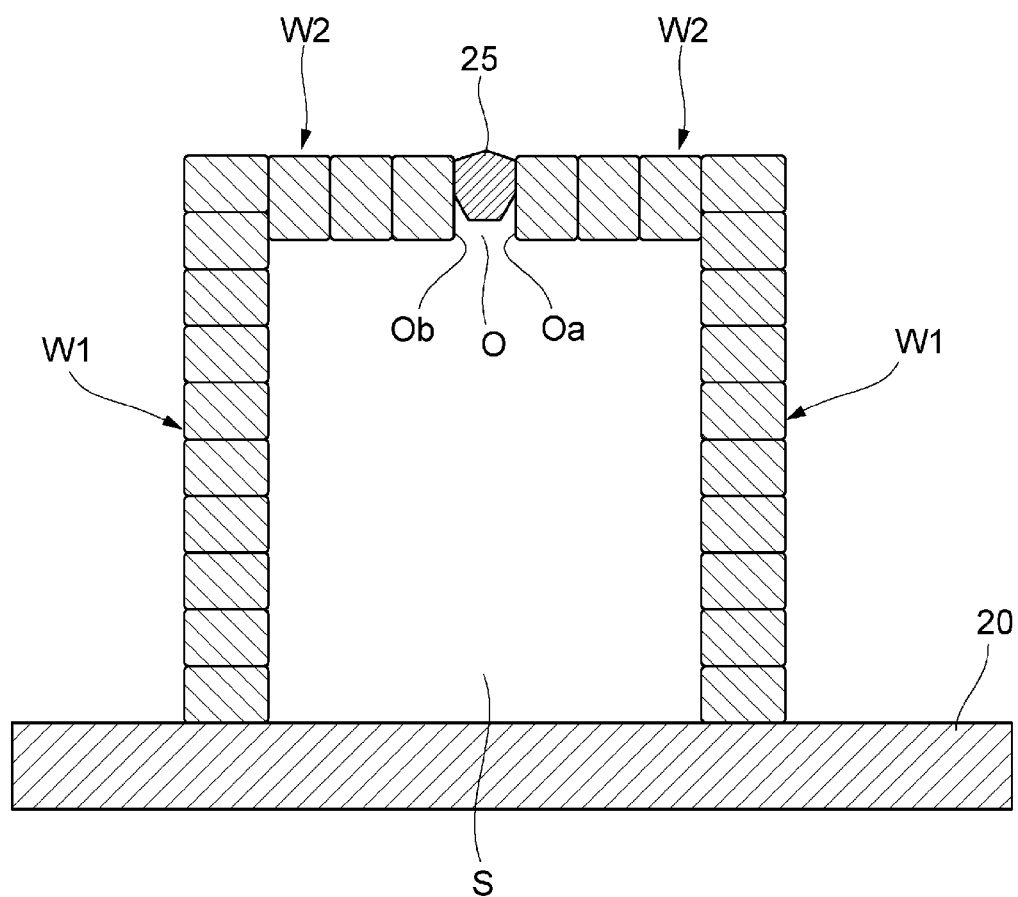
FIG. 9 is a schematic cross-sectional view in the direction orthogonal to the forming direction of the additively-manufactured object, showing a closing step in a reference example.
Figure 10:
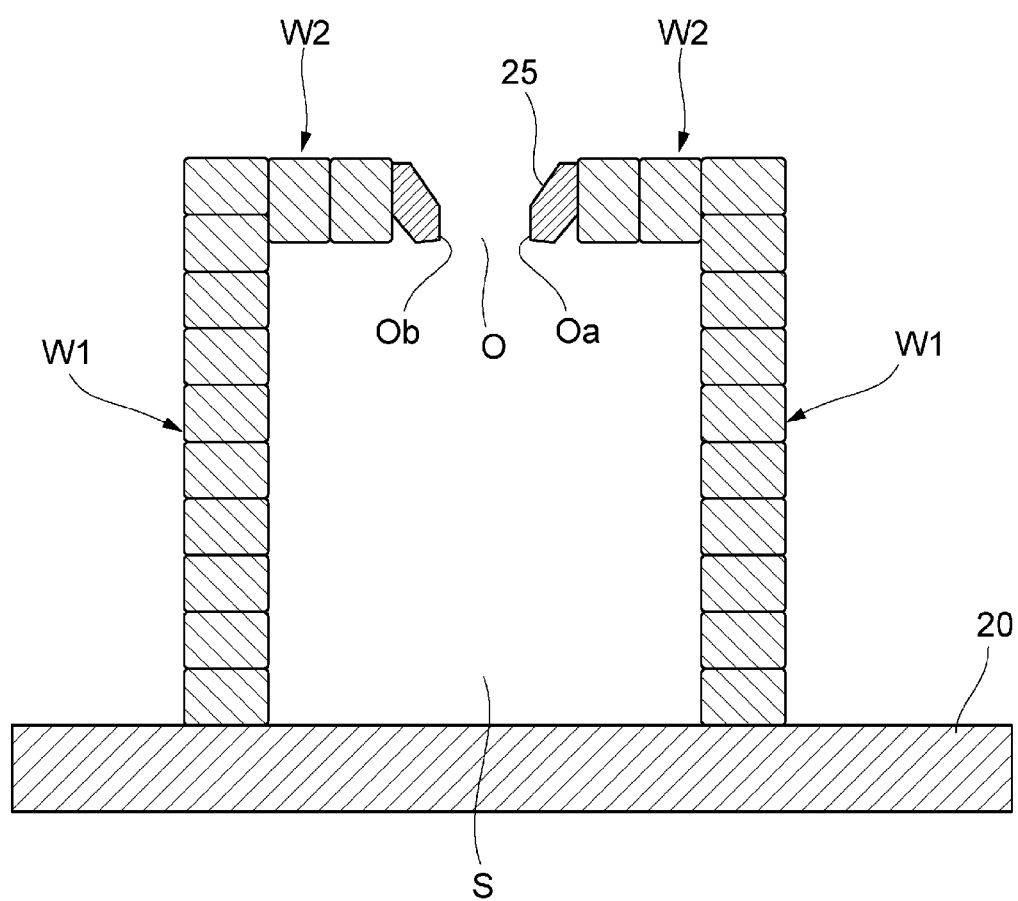
FIG. 10 is a schematic cross-sectional view in the direction orthogonal to the forming direction of the additively-manufactured object, showing the closing step in a reference example.

Here, as shown in FIG. 9, when the opening O is narrower than the bead width HB of the weld bead 25, the weld bead 25 formed in the opening O may not reach a lower end of the opening O, the closure of the opening O may be insufficient, the inner surface shape may be deteriorated, and the bonding strength between the edge portions Oa and Ob of the opening O may decrease. In addition, as shown in FIG. 10, when the width dimension HA of the opening O is widened to simply form the weld bead 25 in the forming direction A, the molten metal of the weld bead 25 may penetrate and melt down.

In contrast, according to the method for manufacturing an additively-manufactured object of the present invention, the opening O is formed with the width dimension HA larger than the bead width HB of the weld bead 25, and the closing wall portion W3 having a width dimension larger than the bead width HB of the weld bead 25 is formed by the weld bead 25 to close the opening O. Accordingly, the opening O can be filled with and closed by the closing wall portion W3 in the thickness direction, and a problem that the molten metal penetrates and melts down at the opening O can be prevented. That is, the opening O can be satisfactorily closed by the closing wall portion W3 made of the weld bead 25, and a high-strength additively-manufactured object W having the internal space S can be manufactured.

Particularly, since a wide closing wall portion W3 made of the weld bead 25 is formed by weaving the torch 17, the opening O having the width dimension HA wider than the bead width HB of the weld bead 25 can be satisfactorily closed, and a high-strength additively-manufactured object W having the internal space S can be manufactured.

Figure 11:
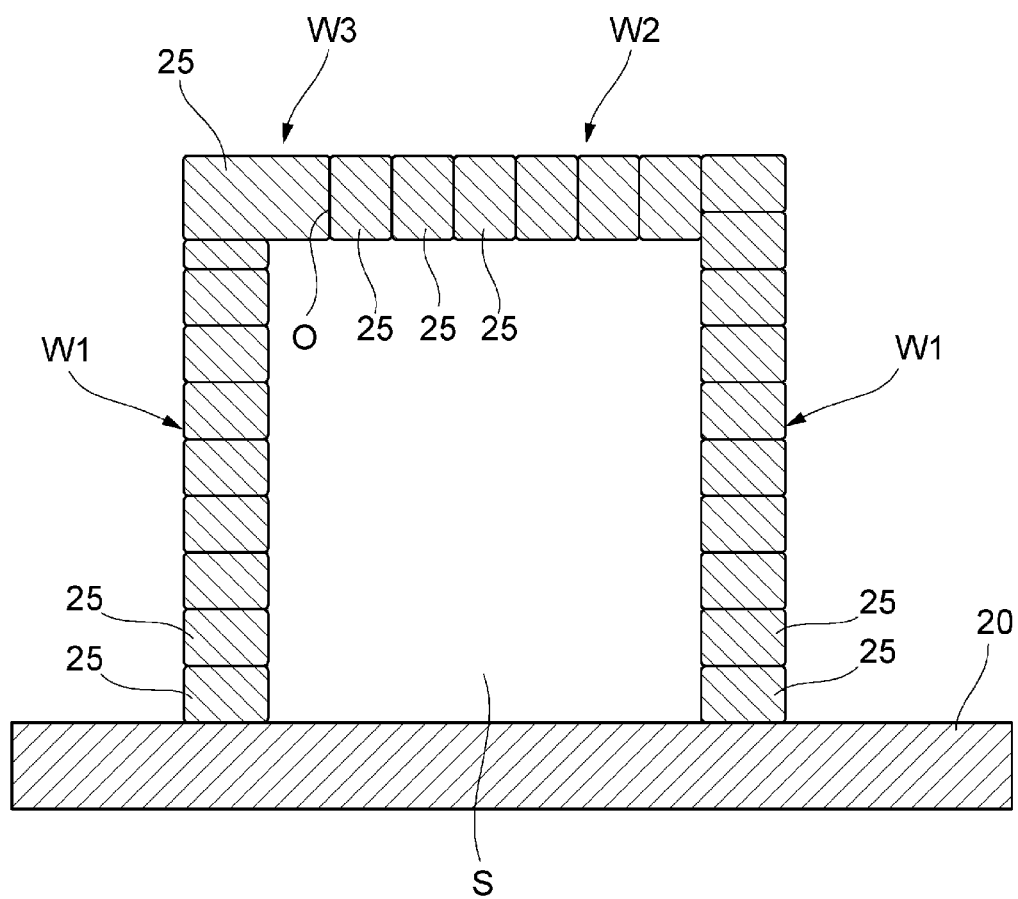
FIG. 11 is a schematic cross-sectional view showing another structure of the additively-manufactured object in the direction orthogonal to the forming direction of the additively-manufactured object.

In the above configuration example, the opening O to be closed by the closing wall portion W3 is formed at a center position in the width direction of the connecting wall portion W2. Alternatively, as shown in FIG. 11, the opening O may be formed between the upper end of one side wall portion W1 and the edge portion of the connecting wall portion W2 deposited from the upper end of the other side wall portion W1, and the opening O may be closed by the closing wall portion W3.

Next, a modification example will be described.

Figure 12:
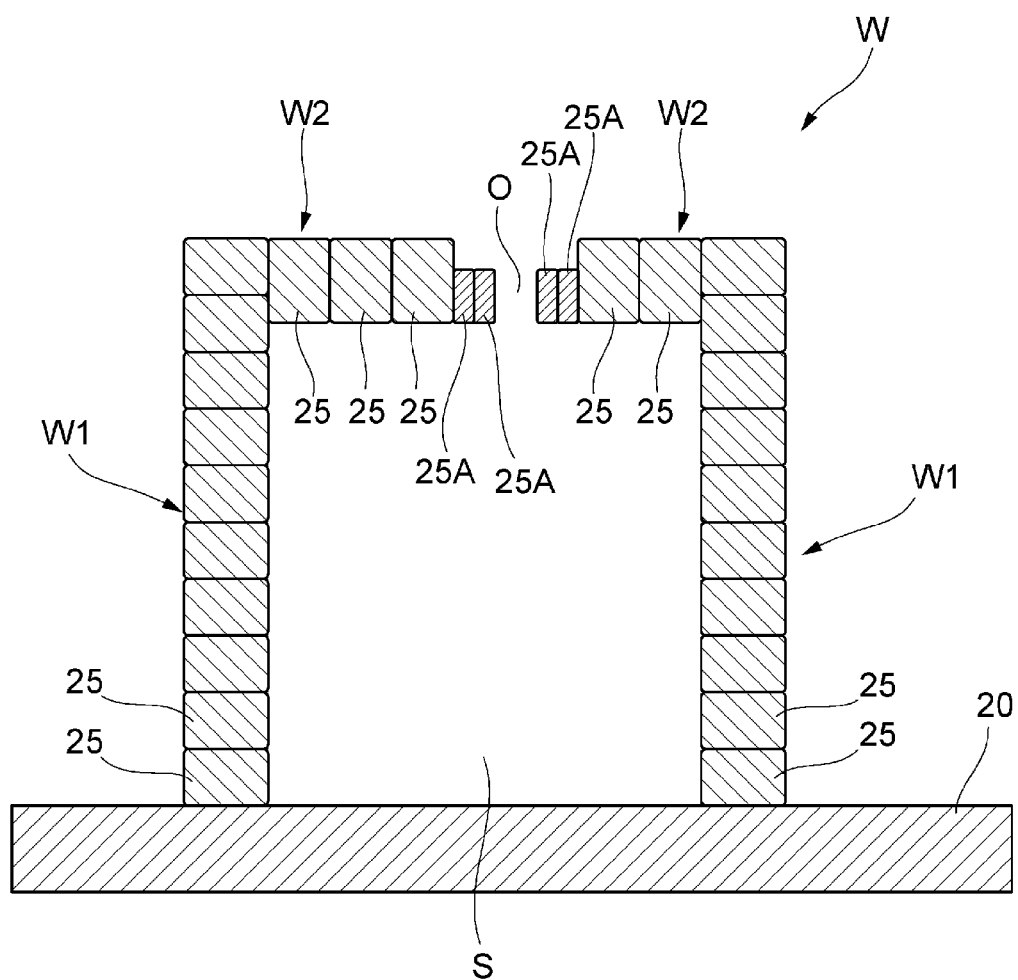
FIG. 12 is a schematic cross-sectional view in a direction orthogonal to a forming direction of an additively-manufactured object, showing a method for manufacturing an additively-manufactured object according to a modification example.

FIG. 12 is a schematic cross-sectional view in a direction orthogonal to a forming direction of an additively-manufactured object, showing a method for manufacturing an additively-manufactured object according to a modification example.

As shown in FIG. 12, in the modification example, the connecting wall portion W2 is built by the weld bead 25 and a narrow weld bead 25A having a bead width different from that of the weld bead 25. Specifically, the edge portions Oa and Ob of the opening O in the connecting wall portion W2 are built by depositing the narrow weld bead 25A having a bead width smaller than the bead width of the weld bead 25 for building another portion. The thickness (bead height) of the narrow weld bead 25A is also reduced by making the bead width smaller than that of the weld bead 25 for building another portion.

Then, the torch 17 is weaved into the opening O formed in the connecting wall portion W2 to form the weld bead 25 to build the closing wall portion W3, and the opening O is thus closed.

According to this modification example, when a plurality of weld beads 25 and narrow weld beads 25A having different bead widths are formed to build the connecting wall portion W2, the width dimension HA of the opening O to be closed by the closing wall portion W3 can be easily adjusted to a width dimension suitable for closing by the closing wall portion W3. Particularly, in the case where the edge portions Oa and Ob of the opening O are built by depositing the narrow weld beads 25A having a smaller bead width, the width dimension HA of the opening O to be closed by the closing wall portion W3 can be finely adjusted, and the width dimension HA of the opening O can be set to a width dimension more suitable for closing by the closing wall portion W3.

In the above configuration examples, the additively-manufactured object W in which both ends of the internal space S are open is built. Alternatively, in the additively-manufacturing step, in the case where the weld bead 25 is deposited on both end portions of the side wall portion W1 to form a wall portion for closing both ends of the additively-manufactured object W, the additively-manufactured object W having a closed space as the internal space S can be easily built.

As described above, the present invention is not limited to the above embodiments, and combinations of the respective configurations of the embodiments, or changes and applications made by those skilled in the art based on the description of the specification and the well-known technology are also intended by the present invention and are included within the scope to be protected.

As described above, the present description discloses the following items.

(1) A method for manufacturing an additively-manufactured object, including:

an additively manufacturing step of building a layered body by depositing a weld bead obtained by melting and solidifying a filler metal, the layered body having an opening along a forming direction of the weld bead and an internal space surrounded by the weld bead; and a closing step of forming a closing wall portion connecting an edge portion of the opening with the weld bead for closing, in which in the additively-manufacturing step, the opening is formed with a width dimension larger than a bead width of the weld bead, and in the closing step, the closing wall portion having a width dimension larger than the bead width is formed by the weld bead to close the opening.

According to this method for manufacturing an additively-manufactured object, the closing wall portion is formed by the weld bead at the opening of the layered body built by depositing the weld bead, so that an additively-manufactured object having an internal space is manufactured. Accordingly, as compared with a case of forming the internal space using a support material, the additively-manufactured object W can be easily manufactured without performing the removal work for the support material that requires time and effort.

Moreover, the opening is formed with a width dimension larger than the bead width of the weld bead, and the closing wall portion having a width dimension larger than the bead width of the weld bead is formed with the weld bead to close the opening, so that the opening can be filled with and closed by the closing wall portion in the thickness direction. Further, a problem that the molten metal penetrates and melts down at the opening can be prevented. Accordingly, the opening can be satisfactorily closed by the closing wall portion made of the weld bead, and a high-strength additively-manufactured object having an internal space can be manufactured.

(2) The method for manufacturing an additively-manufactured object according to (1), in which in the closing step, a torch for forming the weld bead is weaved to form the closing wall portion.

According to this method for manufacturing an additively-manufactured object, the torch is weaved to form a closing wall portion, so that the opening having a width dimension larger than that of the weld bead can be satisfactorily closed, and a high-strength additively-manufactured object having an internal space can be manufactured.

(3) The method for manufacturing an additively-manufactured object according to (1) or (2), in which in the additively-manufacturing step, the weld bead is deposited on a base to build side wall portions facing each other, and the weld bead is deposited laterally from an upper end of the side wall portion to build a connecting wall portion having the opening.

According to this method for manufacturing an additively-manufactured object, it is easy to manufacture a high-strength additively-manufactured object having an internal space surrounded by the base, the side wall portions facing each other and built on the base, the connecting wall portions connecting the upper ends of the side wall portions, and the closing wall portion closing the opening of the connecting wall portion.

(4) The method for manufacturing an additively-manufactured object according to (3), in which a plurality of the weld beads having different width dimensions are formed to build the connecting wall portion.

According to this method for manufacturing an additively-manufactured object, a plurality of weld beads having different width dimensions are formed to form the connecting wall portion, so that the width dimension of the opening to be closed by the closing wall portion can be easily adjusted to a width dimension suitable for closing by the closing wall portion.

(5) The method for manufacturing an additively-manufactured object according to (4), in which the edge portion of the opening on the connecting wall portion is built by depositing a narrow weld bead having a bead width smaller than the bead width of the weld bead that builds another portion.

According to this method for manufacturing an additively-manufactured object, the edge portion of the opening is built by depositing a narrow weld bead having a smaller width dimension, so that the width dimension of the opening to be closed by the closing wall portion can be finely adjusted, and the width dimension of the opening can be set to a width dimension more suitable for closing by the closing wall portion.

(6) An additively-manufactured object, including:

a layered body formed by depositing a weld bead obtained by melting and solidifying a filler metal, the layered body having an opening along a forming direction of the weld bead and has an internal space surrounded by the weld bead; and a closing wall portion configured to close the opening, in which the opening has a width dimension larger than a bead width of the weld bead, and the closing wall portion is formed from the weld bead and has a width dimension larger than the bead width of the weld bead.

According to this additively-manufactured object, it is possible to provide an additively-manufactured object in which the opening of the layered body formed by depositing the weld bead is closed by the closing wall portion made of the weld bead to form an internal space.

The present application is based on Japanese Patent Application No. 2018-200279 filed on Oct. 24, 2018, and the contents thereof are incorporated herein by reference.

REFERENCE SIGNS LIST 20 base
25 weld bead
25A narrow weld bead
A forming direction
HA width dimension
HB bead width
M filler metal
O opening
Oa, Ob edge portion
S internal space
W additively-manufactured object
W1 side wall portion
W2 connecting wall portion
W3 closing wall portion

The invention claimed is:

1. A method for manufacturing an additively-manufactured object, comprising:
an additively-manufacturing step of building a layered body by depositing a plurality of weld beads obtained by melting and solidifying a filler metal, the layered body having an opening along a forming direction of a first weld bead of the plurality of weld beads and an internal space surrounded by the plurality of weld beads; and
a closing step of forming a closing wall portion connecting an edge portion of the opening with a second weld bead of the plurality of weld beads for closing,
wherein
in the additively-manufacturing step, at least a third weld bead of the plurality of weld beads is deposited on a base to build side wall portions facing each other, multiple weld beads of the plurality of weld beads having different width dimensions are deposited laterally from an upper end of a side portion of the side wall portions to build a connecting wall portion having the opening, the edge portion of the opening on the connecting wall portion is built by depositing a narrow weld bead of the plurality of weld beads having a bead width smaller than a bead width of another weld bead of the plurality of weld beads that builds another portion, and the opening is formed with a width dimension larger than a bead width of the second weld bead, and
in the closing step, and the closing wall portion having a width dimension larger than the bead width of the second weld bead is formed by the second weld bead to close the opening.

2. The method for manufacturing an additively-manufactured object according to claim 1, wherein
in the closing step, a torch for forming the weld bead is weaved to form the closing wall portion.

3. An additively-manufactured object, comprising:
a layered body formed by depositing a weld bead obtained by melting and solidifying a filler metal, the layered body having an opening along a forming direction of the weld bead and has an internal space surrounded by the weld bead; and
a closing wall portion configured to close the opening, wherein
the opening has a width dimension larger than a bead width of the weld bead, and
the closing wall portion is formed from the weld bead and has a width dimension larger than the bead width of the weld bead.

* * * * *